United States Patent
Bruchlos et al.

(10) Patent No.: US 8,543,512 B2
(45) Date of Patent: Sep. 24, 2013

(54) LICENSED CONTENT UTILIZATION VALIDATION USING CACHE PARAMETERS

(75) Inventors: Joachim Bruchlos, Calw (DE); Joachim Hagmeier, Stuttgart (DE); Dietmar Kuebler, Altdorf (DE); Timo Kussmaul, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1822 days.

(21) Appl. No.: 10/596,568

(22) PCT Filed: Dec. 1, 2004

(86) PCT No.: PCT/EP2004/053212
§ 371 (c)(1),
(2), (4) Date: Jan. 25, 2007

(87) PCT Pub. No.: WO2005/062532
PCT Pub. Date: Jul. 7, 2005

(65) Prior Publication Data
US 2008/0027735 A1 Jan. 31, 2008

(30) Foreign Application Priority Data
Dec. 22, 2003 (EP) .................... 03104906

(51) Int. Cl.
*H04K 1/00* (2006.01)
*H04L 9/00* (2006.01)

(52) U.S. Cl.
USPC .............. 705/59; 705/51; 705/57; 705/71; 705/75

(58) Field of Classification Search
USPC ............... 705/59, 17, 20, 21, 71, 72; 380/44, 380/262
See application file for complete search history.

(56) References Cited

U.S. PATENT DOCUMENTS

| | | | |
|---|---|---|---|
| 5,175,682 A | 12/1992 | Higashiyama et al. | |
| 5,761,705 A * | 6/1998 | DeKoning et al. | 711/113 |
| 6,119,150 A * | 9/2000 | Fujii et al. | 709/213 |
| 6,795,856 B1 * | 9/2004 | Bunch | 709/224 |
| 2001/0011253 A1 * | 8/2001 | Coley et al. | 705/59 |
| 2002/0083145 A1 * | 6/2002 | Perinpanathan | 709/213 |
| 2003/0005458 A1 * | 1/2003 | Mori | 725/101 |

FOREIGN PATENT DOCUMENTS

| | | |
|---|---|---|
| EP | 1202528 | 5/2002 |
| EP | 1202528 A | 5/2002 |

OTHER PUBLICATIONS

Japanese Patent Office Action, corresponding to Japanese Patent Application No. 2006-546148, issued on Mar. 30, 2010.

* cited by examiner

*Primary Examiner* — Dante Ravetti
(74) *Attorney, Agent, or Firm* — Moore & Van Allen PLLC

(57) ABSTRACT

A utilization method and system within a communication network comprises at least one service provider and at least one service consumer. In particular, a there is license contract method and system for validating web services during runtime. At least one parameter is provided to define, if and how many meter event requests associated with service requests may be stored in a cache memory. The parameter is predefined and may be contained in the license contract. Further, a counter may be provided for counting the service requests. The actual status of the counter is sent to the service consumer and/or the service provider.

15 Claims, 6 Drawing Sheets

LICENSED CONTENT UTILIZATION VALIDATION USING CACHE PARAMETERS

BACKGROUND OF THE INVENT on

1. Field of the Invention

The present invention relates to a utilization method and system within a communication network. In particular, the invention relates to a license contract validation method and system within a computer network for web services during runtime.

2. Description of the Related Art

License contracts for web services or other services within a communication network define regulations concerning the services consumption. The license contracts require online status validation during runtime in order to keep track of license contract violations, e.g. exceeding predefined quantities of service consumption. In many cases the license contract may relate to so-called high value/low quantity web services consumption as well as low value/high quantity web service consumption.

A license contract in general is an agreement between two or more contract parties and specifies the license conditions. In particular, the license contract for web services relates to the conditions for the consumption of web services. It defines one or multiple web services, the identity of the requesting contract party which is called as service consumer, optional attributes specifying the service consumption, like rating, price and quality of service and access regulations. Further the license contract may define consumptive policy, concurrent policy, time based policy, named policy and usage condition policy. The consumptive policy may allow only a specified maximum number of requests. The concurrent policy specifies the maximum number of simultaneous requests. The time based policy defines specified times at which the requests are allowed only. The named policy defines, that only identities defined in the contract can request a service. The usage condition policy may contain that the reselling of services is not allowed, for example.

The consumption of a web service is tracked by a metering service which may be an external server component. Each time, when a web service is invoked, the metering service generates meter events. The content of these meter events specifies, among other data, the license contract associated with the consumption of a web service. Typical examples of meter events are the invocation start time (start event), the invocation end time (end event), the invocation trigger (so-called adhoc event) and the cancellation event (cancel event).

The validation and metering of a web service invocation is processed by an array of sequential handlers. These handlers invoke services in order to perform tasks like the identity verification of the service consumer or the license contract validation. A metering handler invokes the metering service in order to process and store the meter events corresponding to the invocation of the web service. The server component which provides these handlers and services is called a service provider. A server component which offers the requested web service is called a service supplier.

If the service consumer initiates a service request, the message context is extracted from a service request massage at the service provider. The message context contains the relevant information of the service request message. While passing the different handlers, the message context is completed. Thereby additional relevant information is inserted to the message context. Each handler may call a service in order to perform defined activities. These services may be external server components. Such an activity may be the verifying of the identity of the service consumer or the providing of contract and license related data, for example.

At the end of the handler chain, the message context contains all data which are required by the metering handler in order to generate an appropriate metering event request. These additional data may be in particular the approved identity, contract data or license data. Every service invocation induces the generation of various meter event requests. These meter event requests are generated by the metering handler and sent to the metering service. The metering service processes these meter event requests. Since the invocations of the metering service are rather slow, the processing of these meter event requests constitutes a severe system performance bottleneck.

The metering handler of the prior art comprises the message context separator, a meter event generator, a cache controller, a cache memory and a metering service invocator.

The message context separator separates the relevant information from the message context, e.g. service request information, identity of the service consumer, contract and license content, and forwards this information to the meter event generator. The meter event generator creates a meter event request which contains the type of the meter event and the information from the message context. Depending on the status of the web service request, examples of the contained meter event types are the start meter event, the end meter event, the invocation meter event and the cancel meter event.

The cache controller receives the generated meter event request and temporarily stores this meter event request within a dedicated cache memory. Usually the cache memory is physically realized by a RAM memory area. The maximum number of meter event requests which can be stored in the cache memory is a fixed coded program parameter. Therefore, the cache memory can hold a fixed and predetermined number of meter event requests. The number of stored meter event requests is monitored by the cache controller. If the maximum number is exceeded, the cache controller reads all stored event requests from the cache, forwards them to the metering service invocator and finally deletes the content of the cache memory. The metering service invocator generates a message which contains the meter event requests and invokes the metering service in order to process the meter event requests.

The caching of the meter event requests is necessary or at least advantageous, since the invocation of the metering service is slow and requires a high amount of network resources. The slow performance of the metering service invocation is mainly caused by the network transaction time. The transaction time is for transmitting the request to the remote metering service and receiving a reply. The slow performance is further caused by encoding and decoding of messages and by the time which the metering service takes to execute.

The metering service generates meter events from the meter event requests, stores these within a database and notifies the license validation component of the contracting service about the updated status of the database.

The license validation component of a contracting service uses the stored meter events in order to calculate and verify that a web service invocation complies with the service access regulations defined in the corresponding license contract. License contracts for web services are based on license models which describe these service access regulations.

An important license model is the consumptive and/or cumulative service access. This regulation implies that a license contract is valid for a predefined quantity. Such a quantity may define, for example, how many consumers may use the web service under a given license contract. A further important license model is the concurrent service access. This regulation defines the boundaries regarding how many simultaneous service invocations are allowed.

For license contract validation, the license contract validation component invokes the metering service in order to receive the stored meter events which correspond to the license contract. The license contracts, which define regulations concerning accumulation and concurrence of web services consumption, require online status validation during runtime in order to keep track of license contract violations, e.g. the exceeding of predefined quantities of service consumption. The exceeding predefined license contract limits during runtime typically implies business consequences like extra costs, violation fees or even service exclusions.

Since the metering handler stores the meter event requests the cache memory, there is no guarantee that the persistence facility, e.g. database, maintained by the metering service represents the true status of the business service consumption at that point in time when the business service is requested.

Therefore, possible web service consumption violations are only detected after the cache memory has been flushed to the database. This point in time may be well after the time when the service has been requested. This delayed violation detection may imply severe consequences. Service suppliers are not able to detect overload of recourses in the moment of its occurrence. The service consumer is faced with extra costs due to violating consumptive and/or concurrent service access limitations and therefore unpredictable business impacts. Due to the fixed coded caching strategy of the metering handler, the service provider can not adapt the caching of the meter event requests to the needs of the individual contracts.

OBJECT OF THE INVENTION

It is an object of the present invention to provide an improved utilization method and system which overcome the above disadvantages.

SUMMARY OF THE INVENTION

The above object is achieved by a method and system as laid out in the independent claims. Further advantageous embodiments the present invention are described in the dependent claims and are taught in the description below.

The utilization method and system use at least one parameter which defines, if and how many meter event requests associated with the service request may be stored in the cache memory. For example, a boolean parameter may define, if a certain meter event request or an associated signal therewith generally may be stored in the cache memory. Further, an integer parameter associated with the boolean parameter may define, how many of the certain meter event requests or associated signals therewith may be stored in the cache memory. According to another example, the boolean and integer parameter may be provided as one single parameter.

Preferably, a service invocation counter for every offered service may be implemented in the metering system. This counter represents the actual invocation status of a given service as stored in the database.

BRIEF DESCRIPTION OF THE DRAWINGS

The above as well as additional objectives, features and advantages of the present invention will be apparent in the following detailed written description.

The novel features of the invention are set forth in the appended claims. The invention itself and advantages thereof will be best understood by reference to the following detailed description of preferred embodiments in conjunction with the accompanied drawings, wherein.

DETAILED DESCRIPTION OF THE INVENTION

Figure 1:
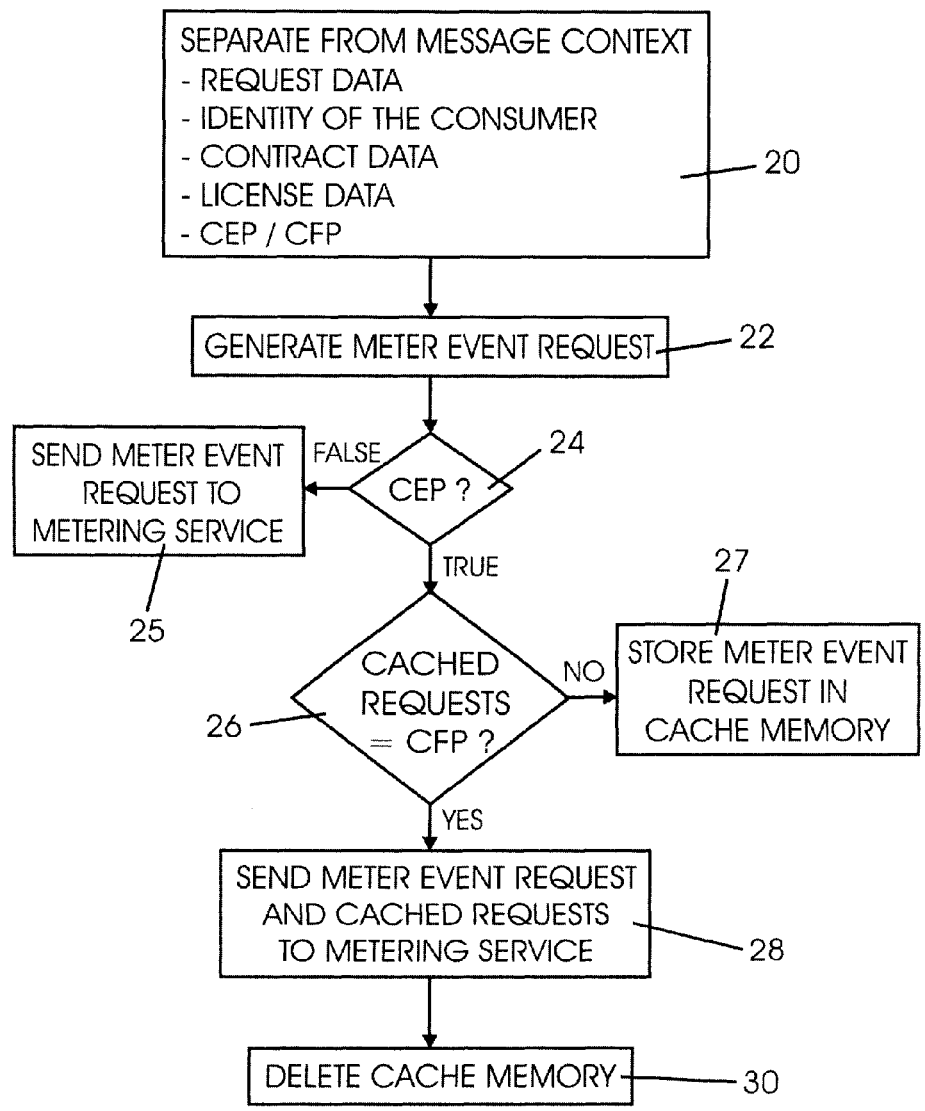
FIG. 1 shows a data flow of a preferred embodiment of the method according to the present invention.

FIG. 1 shows a data flowchart of a license contract validation method according to a preferred embodiment of the present invention.

In a first step 20 the relevant information is separated from a message context. The message context has been extracted from the service request message of a service consumer. The message context may contain service request information, identity of a service consumer, contract and license content and relevant parameters, for example.

In a second step 22 a meter event request is generated which contains the type of the meter event and the relevant information from the message context. Examples of meter event types are a start meter event, an end meter event, an adhoc meter event and a cancel meter event.

The third step 24 evaluates the status of a CEP (Cache Enable Parameter). The CEP is a boolean parameter with the two states TRUE and FALSE. The CEP is contained in the license contract and defines, if the meter event request is allowed to be stored in a dedicated cache memory or not.

If the CEP in step 24 is FALSE, i.e. the meter event request is not allowed to be stored in said dedicated cache memory, then the meter event request will be directly handed over to the metering service according to step 25.

If the CEP in step 24 is TRUE, the meter event request will be forwarded to perform a next step 26. In the next step 26 a CFP (Cache Flush Parameter) is evaluated and compared with the number of meter event requests in said dedicated cache memory. The CFP is an integer parameter and defines the maximum number of meter event requests which may be stored in said dedicated cache memory.

If in the step 26 the number of meter event requests in said dedicated cache memory is less than the defined amount specified by CFP, in the step 27 the meter event request is stored in said dedicated cache memory.

If in the step 26 the number of meter event requests in said dedicated cache memory equals the defined amount specified by the CFP, all meter event requests are transferred from said cache memory to the metering service invocator according to step 28, Finally the content of said cache memory is deleted according to step 30.

The dedicated cache memory is provided to store temporarily the generated meter event request. The CEP and CFP avoid, that too many meter event requests are stored in said cache memory. This method allows, that the maximum number of meter event requests in said cache memory defined by the CFP will not be exceeded.

The metering service invocator receives the meter event requests and invokes a metering service in order to process the meter event requests.

Alternatively, the CEP and the CFP may be provided as one single parameter. This single parameter may be an integer which defines the maximum number of meter event requests in said cache memory. The boolean status FALSE may be represented by the value zero, and the boolean status TRUE by any positive integer value. This single parameter may be also contained in the license contract.

Figure 2:
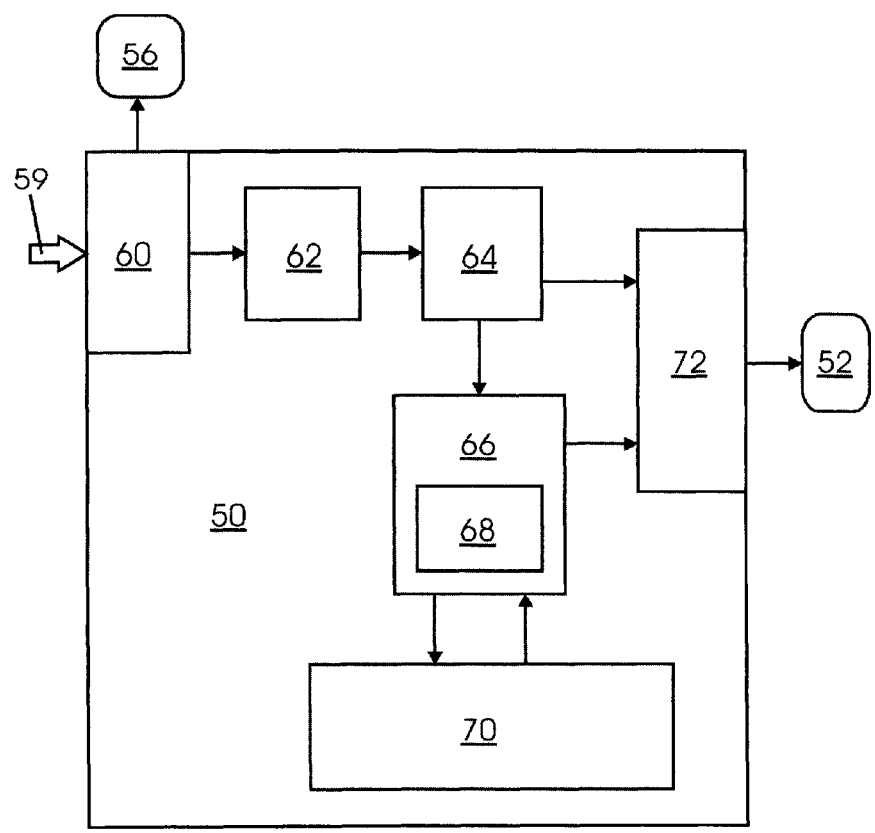
FIG. 2 shows a schematic representation of a preferred embodiment of the system according to the present invention.

FIG. 2 shows a schematic diagram of a preferred embodiment of a license contract validation system according to the present invention. The license contract validation system is realized as a metering handler 50. The components of the metering handler 50 are provided to perform the method according to the data flowchart in FIG. 1.

The metering handler 50 comprises an input device 59, a message context separator 60, a meter event generator 62, a cache enabler 64, a cache controller 66 with an integrated CFP monitor 68, a cache memory 70 and a metering service invocator 72.

The input device 59, the message context separator 60, the meter event generator 62 and the cache enabler 64 are connected in series. The cache enabler 64 includes two outputs. The first output of the cache enabler 64 is connected with the cache controller 66. The second output of the cache enabler 64 is connected with the metering service invocator 72. The CFP monitor 68 is integrated within the cache controller 66. The cache controller 66 is bidirectionally connected with the cache memory 70. Further the cache controller 66 is connected with the metering service invocator 72.

The input device 59 receives a service request message from a service consumer. The message context separator 60 separates the relevant information from the message context, e.g. service request information, identity of the service consumer, contract and license content, and forwards this information to the meter event generator 62. If the web service is invoked by the service provider, the message context separator 60 also forwards the message context to a service handler 56 for immediate execution of the requested web service.

The meter event generator 62 creates a meter event request which contains the type of the meter event and the information from the message context. Depending on the status of the web service request, examples of meter event types are a start meter event, an end meter event, an invocation meter event ('adhoc' event) or a cancel meter event.

The cache enabler 64 evaluates the status of the CEP. If the CEP is TRUE, the meter event request will be forwarded to the cache controller 66. If the CEP is FALSE, the meter event request will be directly handed over to the metering service invocator 72.

The cache controller 66 receives the generated meter event request from the cache enabler 64. The maximum number of meter event requests which may be stored in the cache memory 70 defined by the CFP. The cache memory 70 stores temporarily these meter event requests. Preferably, the cache memory 70 is physically a RAM memory area. The CFP monitor 68 supervises the amount of meter event requests which are stored within the cache memory 70 and takes care that the maximum number defined by the CFP will not be exceeded. If the number of the meter event requests in the cache memory 70 equals the defined amount specified by the CFP, the cache controller 66 transfers all meter event requests to the metering service invocator 72 and finally deletes the content of the cache memory 70. The metering service invocator 72 sends all meter event requests to a metering service which is not necessarily a component of the metering handler 50.

The caching of the meter event requests is advantageous since the invocation of the metering service is slow and consumes a high amount of network resources. The slow performance of the metering service invocation is mainly caused by the network transaction time. This is the time for transmitting the request to the metering service and to receive the reply. Further the slow performance is caused by message handling, e.g. encoding and decoding of messages, and by the time the metering service takes to execute.

The introduction of CEP and CFP allows the contract parties to adapt the license contract validation method to their specific requirements. The deactivation of the CEP, i.e. the status FALSE, disables all caching functionality of the metering handler 50. This guarantees that the metering service and its database reflects the real status of the web service usage. This allows service providers as well as service consumers to ensure, that high value web service requests will never exceed the limits of a cumulative or consumptive license contract boundary. This avoids the risk to overdraw any planned budget limits.

If a service consumer requests many low value web services, enabling the CEP will provide full system performance, even though limiting the risk of uncontrolled budget overdraws by means of defining a reasonable CFP.

A service provider may offer a license contract associated with a specific web service at different prices depending on the definition of CEP and CFP within the license contract, since the setting of these parameters influences the network traffic and resource costs.

FIG. 3 to FIG. 6 illustrate two different applications, in which the metering handler 50 is integrated. These two applications are represented schematic as well as in detail.

Figure 3:
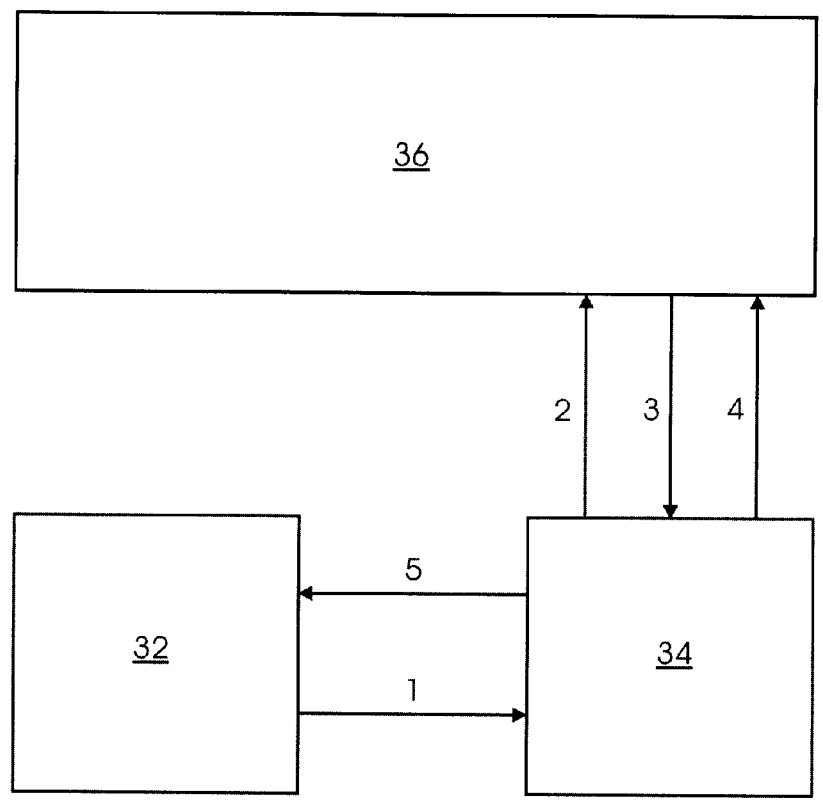
FIG. 3 shows a schematic representation of a first application of the system according to the present invention.

FIG. 3 shows a schematic diagram of the first application. FIG. 3 illustrates the interaction and connection between the service consumer 32, a service supplier 34 and the service provider 36. The service consumer 32 requests a web service provided by the service supplier 34. The service supplier 34 utilizes a service provider 36 in order to validate the identity of the service consumer 32, the validity of the license contract and to meter the service execution.

The sequence of interactions between the service consumer 32, the service supplier 34 and the service provider 36 is described below. The interactions are represented by the arrows 1 to 5. The service consumer 32 initiates 1 a service request in order to invoke a web service which is provided by a service supplier 34. The service supplier 34 receives the request and sends 2 a service request to the service provider 36 in order to use the contracting system and infrastructure services provided by the service provider 36. The service provider 36 performs the requested contracting and infrastructure services, e.g. verifies the consumers identity, validates that a license contract is available, initiates a meter event and returns 3 the status to the service supplier 34. The service supplier 34 performs the requested service and invokes 4 the service provider 36 in order to generate adequate meter events. The service supplier 34 sends 5 resulting service data to the service consumer.

Figure 4:
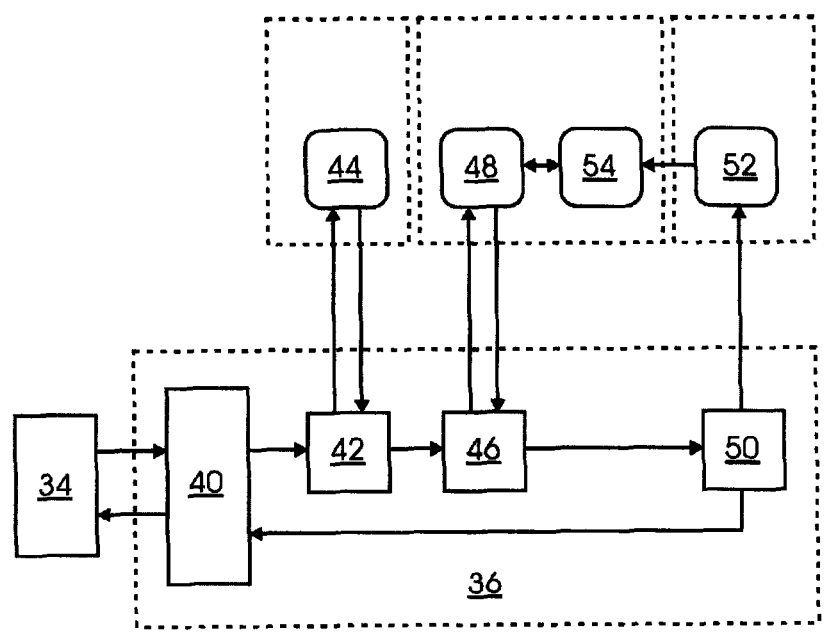
FIG. 4 shows a detailed representation of the first application of the system according to the present invention.

FIG. 4 shows in detail the components of the service provider 36 according to FIG. 3. The service provider 36 is coupled with the service supplier 34 according to FIG. 3. The service provider 36 comprises an interface 40 which is a server side web service interface, a profile handler 42, a contract handler 46 and the metering handler 50 according to FIG. 2. The service provider 36 is coupled with a profile service 44, a contract service 48 and a metering service 52. The profile service 44, the contract service 48 and the metering service 52 may be external server components. Further, the contract service 48 and the metering service 52 are connected with an license verification component 54 which may be also an external server component.

The interface 40 is directly coupled with the service supplier 34. The profile handler 42 uses the profile service 44 in order to verify the identity of the service consumer 32. The contract handler 46 uses the contract service 48 and the license verification component 54 in order to verify contract states and applicable license policies. The metering handler 50 generates adequate meter events, like start events, end events, adhoc events and/or cancel events. The profile service 44 provides the identity check. The contract service 48 verifies the existence of a valid contract. It contains a licensing component which ensures that the service request complies with defined license policies. The metering service 52 generates and stores meter events.

The interactions between these components are described below. The interface 40 receives the service request initiated by the service supplier 34, extracts the message context and passes it on to subsequent handlers. The handlers extend and/or modify the message context and pass it on to the next handler in the chain. The profile handler 42 initiates a service request to the profile service 44 in order to check the identity of the service supplier 34. The profile service 44 returns the identity checking result to the profile handler 42. The contract handler 46 calls the contract service 48 in order to identify and validate a corresponding contract. The license verification component 54 checks for compliance with license policies which are defined in the contract. The license verification component 54 uses actual or historic usage data from the metering service 52 for this purpose. The contract service 48 returns the license contract state, the validation result and relevant contract data to the contract handler 46. The contract handler 46 completes the message context and passes it on to the metering handler 50. The metering handler 50 invokes the metering service 52 in order to generate meter events which reflect the status of the service request. The metering service 52 notifies the license component about usage of the web service. The license verification component 54 uses this information for validation of certain license policies, e.g. consumptive or concurrent license usage. The metering handler 50 returns the updated message context to the interface 40. The interface 40 returns the validation results to the service supplier 34.

The metering service 52 generates meter events from the meter event requests, stores these within a database and notifies the license validation component of a contract service about the updated status of the database. The meter event requests are sent by the metering service invocator 72 of the metering handler 50.

Further, a service invocation counter for each offered license contract is implemented within the license validation component 54. Each counter represents the invocation status of an offered web service as stored in the database of the metering service. The license component gets notified by the metering service every time if the metering service updates its database with newly generated meter events. The license component increments its counters accordingly. The contract service 48 uses these counters in order o verify, if a defined license condition will become exceeded, if a service request arrives.

Figure 5:
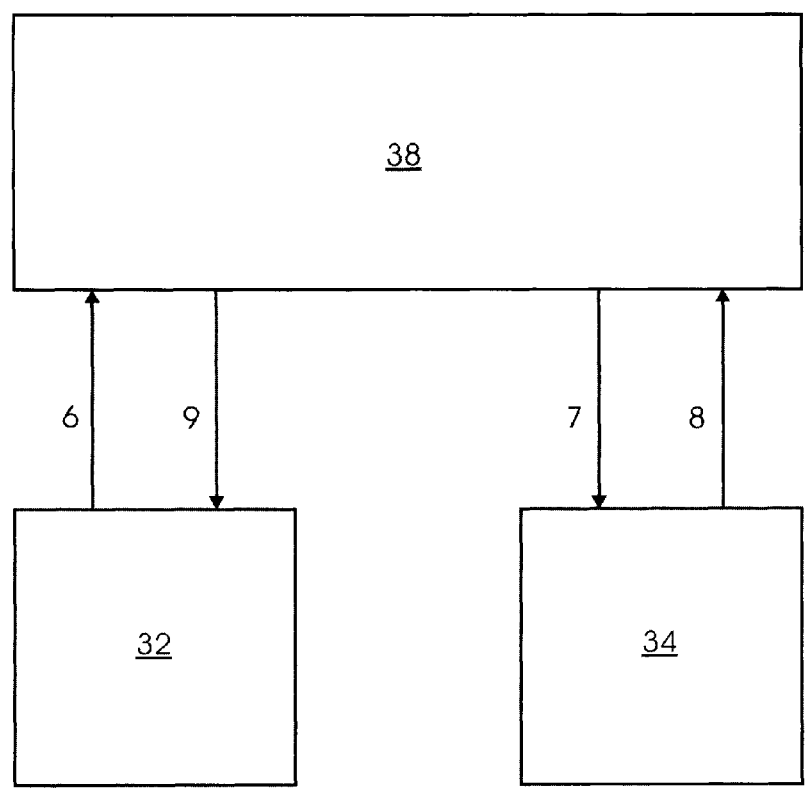
FIG. 5 shows a schematic representation of a second application of the system according to the present invention.

FIG. 5 shows a schematic diagram of the second application. Thereinafter FIG. 5 illustrates the interaction and connection between the service consumer 32, the service supplier 34 and a service provider 38. The service provider 38 offers the web service to the service consumer 32. In order to fulfill a service request, the service provider 38 requests the web service from the service supplier 34.

This requires the following sequence of interactions which are represented by the arrows 6 to 9. The service consumer 32 requests 6 a web service which is offered by the service provider 34. The service provider 38 verifies the identity of the service consumer 32, validates that a license contract is available and usable, initiates a meter event and invokes 7 the requested web service which is provided by the service supplier 34. The service supplier 34 executes the requested service and returns 8 the result to the service provider 34. The service provider 38 generates adequate meter event(s) and returns 9 the web service result to the service consumer 32.

Figure 6:
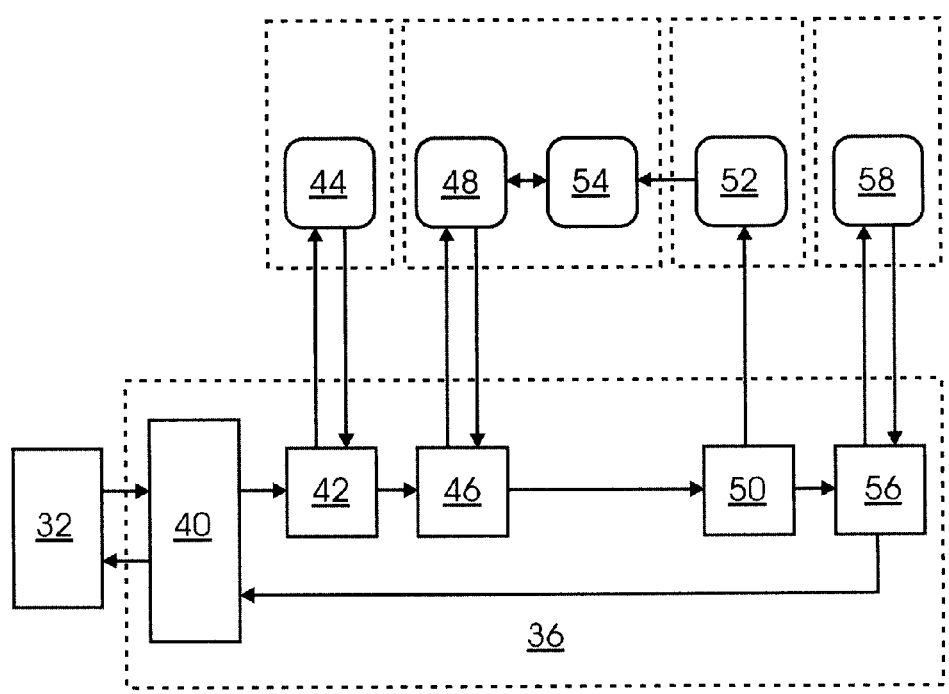
FIG. 6 shows a detailed representation of the second application of the system according to the present invention.

FIG. 6 details the components of the service provider 38 and the sequence of their invocations. Like the service provider 36 in FIG. 4 the service provider 38 also comprises the interface 40 which is a server side web service interface, the profile handler 42, the contract handler 46 and the metering handler 50. Additionally the service provider 38 comprises a service handler 56. The service handler 56 is coupled with a business web service 58. The business web service 58 is an external server component provided by the service supplier 34 in order to fulfill the requested service.

The profile handler 42, the contract handler 46 and the metering handler 50 are connected in the same way like in FIG. 4 with the profile service 44, contract service 48 and the metering service 52, respectively. The profile service 44 which may be an external server component which provides the identity check. The contract service 48 may be an external server component which verifies the existence of a valid contract. It contains a licensing component which ensures that the service request complies with defined license policies. The metering service 52 may be an external server component which generates and stores the meter events.

The interactions between the functional components of the service provider are described below. The interface 40 receives the service request initiated by a service consumer 32, extracts the message context and passes it on to subsequent handlers. The handlers extend and/or modify the message context and pass it on to the next handler in the chain. The profile handler 42 initiates a service request to the profile service 44 in order to check the identity of the service supplier 34. The profile service 44 returns the identity checking result to the profile handler 42. The contract handler 46 calls the contract service 48 in order to identify and validate a corresponding contract. The license verification component 54 checks for compliance with license policies which are defined in the contract. The license verification component 54 uses actual or historic usage data from the metering server 52 for this purpose. The contract service 48 returns 6 the license contract state, the validation result and relevant contract data to the contract handler 46. The contract handler 46 completes the message context and passes it on to the metering handler 50, which is the next handler in the chain. The metering handler 50 invokes the metering service 52 in order to generate meter events which reflect the status of the web service request, e.g. successfully ended or cancelled.

The metering service 52 notifies the license component about usage of the web service. The license verification component 54 uses this information for validation of certain license policies, e.g. consumptive or concurrent license usage. The service handler 56 invokes the requested web service and updates the message context with the resulting service responses. The metering handler 50 returns 10 the updated message context to the interface 40. The interface 40 returns the result of the initial call to the service consumer 32.

Further, service invocation counters are implemented within the license validation component 54. For each offered license contract one service invocation counter is provided. Each service invocation counter represents the invocation status of an offered web service as stored in the metering service database. The license component gets notified by the metering service every time if the metering service updates its database with newly generated meter events. The license component increments these counters accordingly. The contracting service uses these counters in order to verify if a defined license condition will become exceeded if a service request arrives.

The introduction of the service invocation counters within the license component of the contracting service also reduces the network traffic costs by a great amount, since service traffic in between the metering service 52 and the license verification component 54 is only generated if the database was updated. The service invocation counters avoid high network costs.

The following examples demonstrate the benefits of the invention.

Example 1

According to a first example the service consumer 32 needs to allocate server hardware from a service supplier 34 for a one week timeframe, based on a consumptive license contract which sets a limit of maximum five allocations for this contractor. Since this is a high value service request, the service consumer 32 wants to ensure that this boundary, e.g. 5, will not be exceeded. Therefore, he will use a license contract which disables the CEP. In this case, the meter event database and subsequently the corresponding service invocation counter of the license validation component will always represent the current status of the service invocation, eliminating the risk to overrun the limits of the license contract.

Example 2

According to a second example the service consumer 32 runs applications within a computing grid environment. In order to allocate storage dynamically in case that load peeks occur, he runs these applications under a consumptive license contract with a storage supplier. Since the allocation of extra storage is considered to be a low value but frequently invoked service, the license contract was designed based on the precalculated maximum allocation but allows exceeding this limit for a certain amount by enabling the CEP and defining a reasonable CFP. This ensures that the storage allocation continues even if the upper limit is temporarily exceeded. Therefore the consumers operation is not interrupted, while the risk to overrun extra cost targets is limited.

Example 3

According to a third example the service provider 38 offers a business application as web service under different rating and/or pricing conditions. The corresponding license contracts differ in the values for CEP and CFP since these parameters strongly influence the costs at which the service provider 38 can offer the web service. This allows the service provider 38 to offer his web service with different price tags, depending on his risk to calculate the corresponding provisioning costs.

The system of the present invention may be realized in hardware, software or a combination of hardware and software.

The present invention can also be embedded in a computer program product which comprises all the features enabling the implementation of the methods described herein. Further, when loaded in computer system, said computer program product is able to carry out these methods.

While the invention described herein relates mainly to web services, the invention is further applicable to arbitrary services within any kind of a communication network.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

LIST OF REFERENCE NUMERALS 20 step of separating data from message context
22 step of generating meter event request
24 step of evaluating the boolean parameter
25 step of sending meter event request to metering web service
26 step of evaluating the integer parameter
27 step of storing meter event request in cache memory
28 step of sending meter event request and cached meter event requests to metering service
30 step of deleting cache memory
32 service consumer
34 service supplier
36 service provider
38 service provider
40 interface
42 profile handler
44 profile service
46 contract handler
48 contract service
50 metering handler
52 metering service
54 license verification component
56 service handler
58 business web service
59 input device
60 message context separator
62 meter event generator
64 cache enabler
66 cache controller
68 CFP monitor
70 cache memory
72 metering service invocator

The invention claimed is:

1. A utilization method within a communication network, the method comprising:
receiving, by a metering handler, a service request message from a service consumer;
generating, by the metering handler, a meter event request associated with the service request;
evaluating, by the metering handler, a status of at least one parameter;
comparing, by the metering handler, an amount of stored meter event requests stored in a cache memory with the at least one parameter;
storing, by the metering handler, the meter event request in the cache memory or sending the meter event request and an entire contents of the cache memory to a metering service in order to process the meter event requests based on the evaluation and the comparison;

wherein said at least one parameter is associated with the service request and a predefined convention, and said at least one parameter defines how many meter event requests may be stored in the cache memory.

2. The method of claim 1, wherein the evaluating the status of the at least one parameter comprises evaluating a status of a boolean parameter which indicates if the meter event request is allowed to be stored in the cache memory.

3. The method of claim 1, wherein the comparing the amount of stored meter event requests stored in a cache memory with the at least one parameter comprises:

evaluating, by the metering handler, a value of an integer parameter associated with the boolean parameter; and comparing, by the metering handler, said value of the integer parameter with the amount of stored meter event requests stored in the cache memory.

4. The method of claim 3, further comprising sending, by the metering handler, the meter event request to the metering service in order to process the meter event request and deleting, by the metering handler, the entire contents of the cache memory if the actual number of the meter event requests in the cache memory equals or increases the value of the integer parameter.

5. The method of claim 3, wherein the meter event request is stored in the cache memory when the actual number of the meter event requests in the cache memory is less than said value of the integer parameter.

6. The method of claim 1, wherein the predefined convention is defined in a license contract which relates to kinds and amount of services between a service provider and the service consumer.

7. The method of claim 1, wherein a relevant information is separated, by the metering handler, from the service request message after receiving the service request message.

8. The method of claim 7, wherein the relevant information of the service request message comprises at least one of request data, contract data, license data, the boolean parameter, the integer parameter and the identity of the service consumer.

9. The method of claim 1 further comprising:

counting, by the metering handler, the services when the associated meter event request is sent to the metering service; and sending, by the metering handler, the actual counting results to at least one of a service provider and the service consumer.

10. A computer readable medium comprising hardware having computer usable program code embodied therewith, the computer usable program code when executed causing a processing device to perform:

receiving a service request message from a service consumer;

generating a meter event request associated with the service request;

evaluating, by a cache enabler, a status of at least one parameter;

comparing an amount of stored meter event requests stored in a cache memory with the at least one parameter;

storing the meter event request in the cache memory or send the meter event request and an entire contents of the cache memory to a metering service in order to process the meter event requests based on the evaluation and the comparison;

wherein said at least one parameter is associated with the service request and a predefined convention, and said at least one parameter defines how many meter event requests may be stored in the cache memory.

11. The computer readable medium of claim 10, wherein the comparing the actual content of a cache memory with at least one parameter comprises evaluating a status of a boolean parameter which indicates if the meter event request is allowed to be stored in the cache memory.

12. The computer readable medium of claim 11, wherein the comparing the actual content of a cache memory with at least one parameter comprises:

evaluating a value of an integer parameter associated with the boolean parameter; and comparing said value of the integer parameter with the content of the cache memory.

13. The computer readable medium of claim 12, further comprising configuring to send the meter event request to the metering service in order to process the meter event request and deleting the content of the cache memory if the actual number of the meter event requests in the cache memory equals or increases the value of the integer parameter.

14. The computer readable medium of claim 12, wherein the meter event request is stored in the cache memory if the actual number of the meter event requests in the cache memory is less than said value of the integer parameter.

15. The computer readable medium of claim 10, wherein the predefined convention is defined in a license contract which relates to the kinds and amount of services between a service provider and the service consumer.

* * * * *